United States Patent
Cui et al.

(10) Patent No.: US 10,481,325 B2
(45) Date of Patent: Nov. 19, 2019

(54) FABRICATION METHOD OF MULTI-CORE FIBER BRAGG GRATING PROBE USED FOR MEASURING STRUCTURES OF A MICRO PART BASED ON THE CAPILLARY SELF-ASSEMBLE TECHNIQUE

(71) Applicant: HARBIN INSTITUTE OF TECHNOLOGY, Harbin, Heilongjiang (CN)

(72) Inventors: Jiwen Cui, Heilongjiang (CN); Kunpeng Feng, Heilongjiang (CN); Hong Dang, Heilongjiang (CN); Shiyuan Zhao, Heilongjiang (CN); Junying Li, Heilongjiang (CN); Jiubin Tan, Heilongjiang (CN)

(73) Assignee: HARBIN INSTITUTE OF TECHNOLOGY, Harbin, Heilongjiang (CN)

( * ) Notice: Subject to any disclaimer, the term of this patent is extended or adjusted under 35 U.S.C. 154(b) by 186 days.

(21) Appl. No.: 15/503,836

(22) PCT Filed: Mar. 2, 2016

(86) PCT No.: PCT/CN2016/075270
§ 371 (c)(1),
(2) Date: Feb. 14, 2017

(87) PCT Pub. No.: WO2016/138853
PCT Pub. Date: Sep. 9, 2016

(65) Prior Publication Data
US 2017/0276868 A1    Sep. 28, 2017

(30) Foreign Application Priority Data

Mar. 5, 2015   (CN) .......................... 2015 1 0107909
Mar. 5, 2015   (CN) .......................... 2015 1 0109878
(Continued)

(51) Int. Cl.
G02B 6/02      (2006.01)
G01B 11/16     (2006.01)
(Continued)

(52) U.S. Cl.
CPC .......... G02B 6/02209 (2013.01); G01B 11/18 (2013.01); G02B 6/02185 (2013.01);
(Continued)

(58) Field of Classification Search
CPC ....................................................... G02B 6/02
(Continued)

(56) References Cited

FOREIGN PATENT DOCUMENTS

| CN | 104677283 A | 6/2015 |
|---|---|---|
| CN | 104677290 A | 6/2015 |

(Continued)

OTHER PUBLICATIONS

Pei Li et al., "Key technologies for side-grinding optical fiber with long-length and high-precision and their applications", Infrared and Laser Engineering, Feb. 2010, vol. 39, No. 1.
(Continued)

*Primary Examiner* — Kaveh C Kianni
(74) *Attorney, Agent, or Firm* — Kenja IP Law PC

(57) ABSTRACT

A fabrication method of a multi-core fiber Bragg grating (FBG) probe for measuring structures of a micro part based on the capillary self-assembly technique, wherein the diameter of the fiber (6) inscribed with FBG is reduced using a mechanical method or an etch method by the hydrofluoric acid; the fibers (6) inscribed with FBG, whose diameter has been reduced, are inserted into a tube (7) through its terminal with an inner taper angle; the FBG terminals of these fibers (6) are immersed into the UV adhesive (10) of a low viscosity and the UV adhesive (10) is raised in the gaps between the fibers (6); or the UV adhesive is dropped on these fibers (6) and the capillary bridge between the fibers
(Continued)

(6) is formed; a most compact structure of the fiber bundle is formed as a result of the capillary self-assembly; the fiber bundle is cured using a UV light and the multi-core FBG (11) is therefore formed; the terminal of the multi-core FBG (11) is polished with an optic fiber polishing machine and then a spherical tip is fabricated with the melting fiber method or the installation method of a micro ball; therefore, a multi-core FBG (11) probe can be achieved. The method features low crosstalk between signal of FBG, inexpensive and low insertion loss.

10 Claims, 3 Drawing Sheets

(30) Foreign Application Priority Data

Mar. 5, 2015 (CN) .......................... 2015 1 0111282
Mar. 5, 2015 (CN) .......................... 2015 1 0111283

(51) Int. Cl.
*G02B 6/04* (2006.01)
*G11B 11/00* (2006.01)

(52) U.S. Cl.
CPC ............ *G02B 6/04* (2013.01); *G02B 6/02123* (2013.01); *G11B 11/00* (2013.01)

(58) Field of Classification Search
USPC .......................................................... 385/115
See application file for complete search history.

(56) References Cited

FOREIGN PATENT DOCUMENTS

CN 104677293 A 6/2015
CN 104677294 A 6/2015

OTHER PUBLICATIONS

Feng Kunpeng, "Research on Microscale Dimensional Measurement Using Four Cores Fiber Bragg Grating Probe", State Outstanding Master Degree Thesis Database—Information Technology Journal, 2015, Issue 2.
Jun. 13, 2016, International Search Report issued in the International Patent Application No. PCT/CN2016/075270.

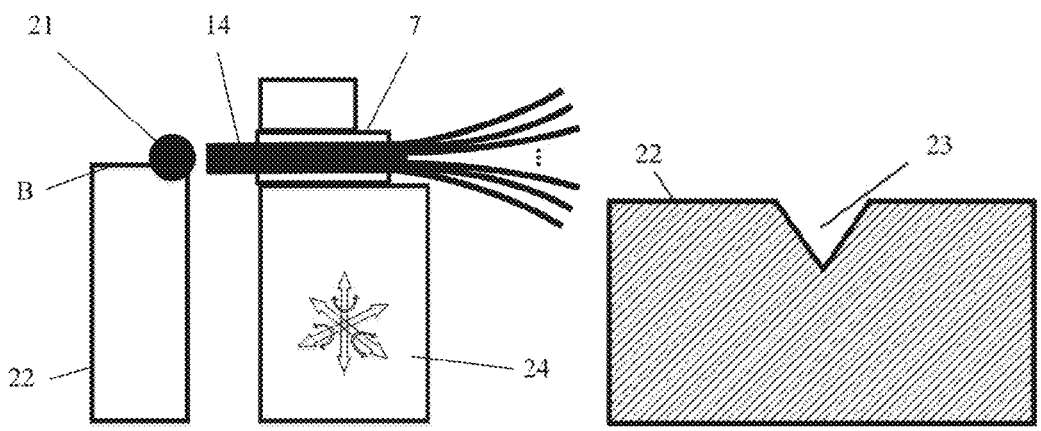
Fig. 8
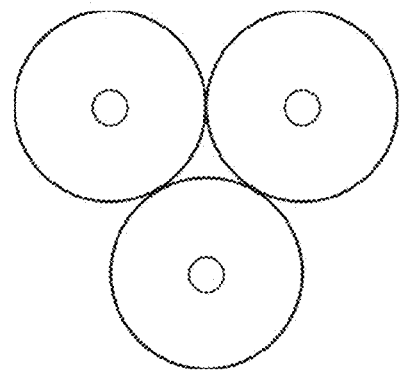
Fig. 9
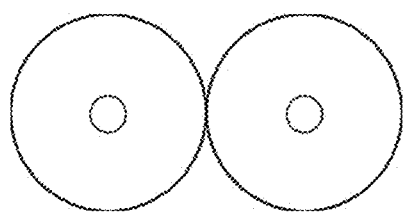
Fig. 10A
Fig. 10B
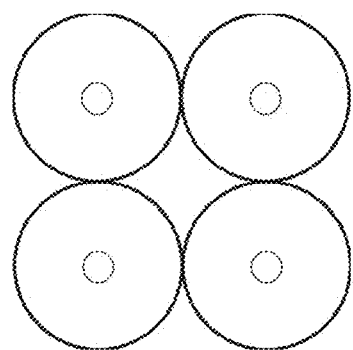
Fig. 10C
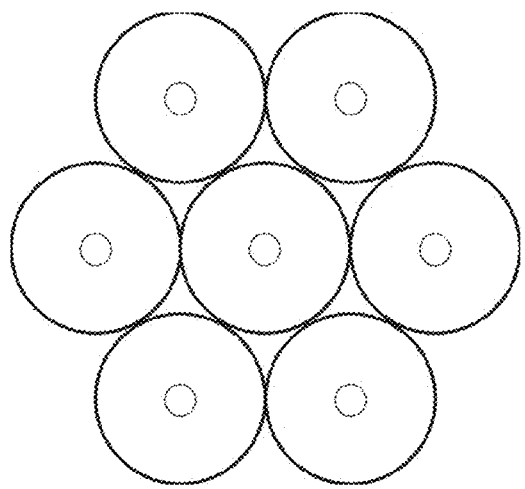
Fig. 10D

FABRICATION METHOD OF MULTI-CORE FIBER BRAGG GRATING PROBE USED FOR MEASURING STRUCTURES OF A MICRO PART BASED ON THE CAPILLARY SELF-ASSEMBLE TECHNIQUE

TECHNICAL FIELD

The invention relates to a fabrication method based on the capillary self-assemble technique of the multi-core fiber Bragg grating (FBG) probe for measuring structures of a micro part, wherein the diameter of the fiber inscribed with FBG is reduced using a mechanical method or a etch method by the hydrofluoric acid; the fibers inscribed with FBG, whose diameter has been reduced, are inserted into a tube through its terminal with an inner taper angle; the FBG terminal of these fibers are immersed into the UV adhesive of a low viscosity and the UV adhesive is raised in the gaps between the fibers; or the UV adhesive of a low viscosity is dropped on the these fibers and the capillary bridge between the fibers is formed; a most compact structure of the fiber bundle is formed as a result of the capillary self-assembly; the fiber bundle is cured using a UV light and the multi-core FBG is therefore formed; the terminal of the multi-core FBG is polished with an optic fiber polishing machine and then a spherical tip is fabricated with the melting fiber method or the installation method of a micro ball; therefore, a multi-core FBG probe can be achieved.

BACKGROUND

With fast development of aerospace, aviation, automobile, electronic and advanced manufacturing, the demands of micro parts are dramatically increasing. Due to the shadow effects, limited probing space and force, the precision and measurable depth cannot satisfy the requirement of the measurement. To achieve the measurement of more tiny structure and enhance the measurable depth, high-aspect-ratio tactile probes are usually inserted into the micro parts and a trigger method is applied to get inner contact points. In general, the structures of a micro part are measured using a coordinate measuring machine (CMM) combining with a tactile probe. The CMM technology is relatively mature and a precise three-dimension motion is already equal to the measurement. It can be concluded that it is of great significance to develop a precise probing system for measuring structures of a micro part. FBG probes are not influenced by the shadow effect and the measurable depth is either not limited as a result of the separation between the probe and the sensing system. They also feature miniaturization and anti-interference. So FBG probes are very suitable for dimensional measurement of structures of a micro part.

Existing FBG probes include following designs:

Jiwen Cui and Fuling Yang proposed in 2011 a FBG bending probe for the measurement of micro holes. Their FBG probe is fabricated by common single mode fiber and the core comprising FBG is located in the center of the probe. Therefore, the FBG is in the neutral plane when the probe is used to achieve radial measurement. The radial resolution of this probe is low and it cannot be used to achieve the measurement of a micro hole. The structure of this FBG probe is not reasonable and its performance cannot further be improved.

Jiwen Cui and Kunpeng Feng proposed in 2014 a method and equipment based on multi-core FBG probe for measuring structures of a micro part. A multi-core FBG probe is designed and the FBG is subjected to the sufficient stress when the multi-core FBG probe gets contacted with the micro parts. In comparison to the FBG bending probe, the resolution, especially the radial resolution, is significantly improved, and decouple capacity of two-dimensional radial displacement and three-dimensional displacement can be achieved by designing the distribution of the fiber cores. The multi-core FBG probe has favourable characters. However, inscription of FBG on the fiber cores of multi-core fiber brings several problems. On the one hand, there is intense crosstalk among the inscription of FBGs on each fiber cores of multi-core fiber. On the other hand, parameters of the multi-core FBG probe cannot be designed as a result that the brought multi-core fiber is already determinate.

Above all, the multi-core FBG probe has a high resolution, especially the radial resolution, and a decouple capacity of multi-dimensional displacement. It attracts extensive attentions and has a good application prospect of all the existing FBG probes. However, the multi-core FBG probe has following drawbacks:

1. Considering the cost of the probe, the multi-core fiber cannot be customized and should be selected among the manufacturers' existing types. So the parameter of the multi-core FBG probe cannot be designed as the requirement of the measurement because of the limited multi-core fiber types.

2. The distance among fiber cores is several ten micrometers and inscription of FBGs on each fiber cores of multi-core fiber has intense crosstalk. The spectra of the FBGs on the fiber cores are distorted and their reflectivity is low, which influences the accuracy of the measurement.

3. The optical signals should access to every cores of the multi-core fiber to achieve the spectrum of the FBGs and a fan-out device should be configured. However, the fan-out device for the multi-core FBG probe has such disadvantages as expensive price, high insertion loss. So it is adverse to apply the multi-core FBG probe in the field of the dimensional measurement that the multi-core FBG probe is directly made of the brought multi-core fiber.

SUMMARY OF INVENTION

One purpose of the present invention is to propose a fabrication method of the multi-core fiber Bragg grating probe for measuring structures of a micro part based on capillary self-assemble technique. This invention solves the problems that the parameter of the multi-core FBG probe is restricted by the multi-core fiber brought from manufacturers, the inscription of FBG on the fiber cores of multi-core fiber has intense crosstalk and the insertion loss is high.

A fabrication method of the multi-core FBG probe for measuring structures of a micro part based on the capillary self-assemble technique may include:

Step 1. Reducing the diameter of the fiber inscribed with FBG which can include

Firstly, preparing a fiber inscribed with FBG of 100 mm~1000 mm in length, where the FBG part, located at the 30 mm~50 mm from the terminal of the fiber inscribed with FBG, is 10 mm~20 mm in length; Secondly, stripping the coating of 50 mm~80 mm in length off the fiber inscribed with FBG from its terminal close to the FBG part;

Thirdly, reducing the diameter of the part without coating of the fiber inscribed with FBG using the mechanical method, which may include following procedures:

Straightening the fiber inscribed with FBG,

Fixing the fiber inscribed with FBG on the setting mechanism of the synchronous-rotation motor and aligning the axis of the fiber inscribed with FBG with that of the synchronous-rotation motor, Polishing the fiber inscribed with FBG, the wheel covered by the polishing slice above the axis of rotation of the synchronous-rotation motor polishes the part without the coating of the fiber inscribed with FBG repeatedly at a constant speed along its axis, and Monitoring the procedure of the polishing with a microscopy system and stopping the polishing when the diameter of the part without the coating of the fiber inscribed with FBG is d, wherein d is in a range from 50 μm to 100 μm, and the fiber inscribed with FBG whose diameter has been reduced is achieved; and Fourthly, cutting off the fiber inscribed with FBG whose diameter has been reduced of 30 mm~50 mm in length using a cleaver, and making sure that the FBG part is located at the terminal of the fiber inscribed with FBG whose diameter has been reduced and its length is in a range from 5 to 10 mm;

Then, the fiber inscribed with FBG whose diameter has been reduced can be washed using an ultrasonic cleaner with the anhydrous ethanol for 5 min~20 min;

Step 2. Self-assembly of the fiber inscribed with FBG whose diameter has been reduced which can include Firstly, preparing a tube of 10 mm~30 mm in length and D=(50 μm~100 μm)×3+(1 μm~50 μm) in inner diameter which has an inner taper angle at one terminal;

Secondly, inserting the N fibers inscribed with FBG whose diameter has been reduced by step 1 into the tube from the terminal with an inner taper angle and making sure that their FBG terminals of 5 mm~10 mm in length out of the tube is parallel;

Thirdly, fixing the tube vertically and immersing the FBG terminal of the fibers inscribed with FBG whose diameter has been reduced into the a glass with the UV adhesive of less than 100 cp in viscosity for 5 min~15 min, wherein the immersion depth is 3 mm~6 mm; the UV adhesive is raised in the gaps between the fibers inscribed with FBG whose diameter has been reduced and a most compact structure of fiber bundle is formed as a result of the capillary self-assembly; and Fourthly, taking the tube and the fiber bundle within the tube out of the UV adhesive without the dislocation of the fiber bundle, and curing the fiber bundle with UV adhesive using a UV light for 1 min~10 min to form the multi-core FBG;

Then the inner taper angle of the tube can be filed with thermosetting adhesive which can then be cured using for example a heater at a constant temperature of for example 50° C.~180° C. for 10 min~60 min;

Step 3. Polishing the terminal of the multi-core FBG, which may include:

Firstly, fixing the tube with the multi-core FBG on the optic fiber polishing machine and adjusting the height of the tube to make the terminal of the multi-core FBG contacted with the polishing slice;

Secondly, polishing the terminal of the multi-core FBG as the way for processing the FC/PC connector and stopping the polishing when the terminal is smooth and impeccable, and the polished multi-core FBG is achieved;

Then, the terminal of the polished multi-core FBG can then be cleaned using dust-free paper and anhydrous ethanol; and Step 4. Fabricating a spherical tip on the polishing terminal of the polished multi-core FBG through the melting fiber method, which can include:

Firstly, fixing the tube with the polished multi-core FBG processed by step 3 vertically;

Secondly, adjusting the height of the polished multi-core FBG and make the polishing terminal located at 0.5 mm~3 mm below the electrode of the electric discharge machine;

Thirdly, adjusting the discharge time and intensity of the electric discharge machine and melting the polished multi-core FBG; the melt fiber forms a favorable sphere because of the gravity and the surface tension, and a spherical tip is fabricated on the polishing terminal of the polished multi-core FBG after it becomes cool; a multi-core FBG probe is thus fabricated.

reducing the diameter of the part without the coating of the fiber inscribed with FBG in step 1 can be achieved using a etching method by the hydrofluoric acid to reduce the diameter of the fiber inscribed with FBG, which can include:

Inserting the fiber inscribed with FBG through the micro holes on the cover of the plastic bucket with the hydrofluoric acid solution of 10%~50% in volume fraction and making the part without the coating of the fiber inscribed with FBG downward into the plastic bucket;

Adjusting the length of the fiber inscribed with FBG out of the cover and making the part without the coating of the fiber inscribed with FBG immersing into the hydrofluoric acid solution of 10%~50% in volume fraction, wherein the immersion depth is 60 mm~90 mm;

Taking the fiber inscribed with FBG out of the plastic bucket every 20 min~30 min and measuring the diameter of the part without the coating of the fiber inscribed with FBG using a microscope;

Stopping the etch process when the diameter of the part without the coating of the fiber inscribed with FBG is etched to d, wherein d is in a range from 50 μm to 100 μm, and the fiber inscribed with FBG whose diameter has been reduced is achieved;

Putting the fiber inscribed with FBG whose diameter has been reduced into the glass with the acetone solution for 10 min~30 min for the softening process, wherein the immersion depth is 80 mm~90 mm.

Step 2 can be dropping the UV adhesive on these fibers inscribed with FBG whose diameter has been reduced, which can include:

Firstly, preparing a tube of 10 mm~30 mm in length and D in diameter which has an inner taper angle at one terminal;

Secondly, inserting the N fibers inscribed with FBG whose diameter has been reduced by step 1 into the tube from the terminal with an inner taper angle and making sure that their FBG terminals of 5 mm~10 mm in length out of the tube is parallel;

Thirdly, fixing the tube horizontally and dropping the UV adhesive of less than 100 cp in viscosity on the these fibers between the tube and the terminal of the fibers inscribed with FBG whose diameter has been reduced;

Fourthly, holding the tube for 5 min~15 min, and the UV adhesive wets the fibers and forms the capillary bridges between the close fibers inscribed with FBG whose diameter has been reduced which are thus subjected to the capillary force, and a most compact structure of fiber bundle is formed as a result of the capillary self-assembly;

Fifthly, curing the fiber bundle with UV adhesive using a UV light for 1 min~10 min to form the multi-core FBG;

Then, filling the inner taper angle of the tube with the thermosetting adhesive and curing it using a heater at a constant temperature of 50° C.~180° C. for 10 min~60 min.

The material of the tube of the step 2 can be quartz or metal.

Fabricating a spherical tip on the polishing terminal of the polished multi-core FBG in step 4 can be achieved through installation method of a micro ball which can include:

Firstly, fixing the tubes with the polished multi-core FBG processed by step 3 in parallel on an adjustment device with six degree of freedom;

Secondly, dropping the UV adhesive onto the polishing terminal of the polished multi-core FBG using a micropipette;

Thirdly, aligning the axes of the polishing terminal of the polished multi-core FBG with UV adhesive and the spherical ruby tip on the V-groove of the horizontal bench under a microscope, and pushing ahead the polishing terminal of the polished multi-core FBG to get contacted with the spherical ruby tip;

Fourthly, curing the contact point with UV adhesive using a UV light for 1 min~10 min, and a spherical tip is fabricated on the polishing terminal of the polished multi-core FBG; a multi-core FBG probe is thus fabricated.

In some embodiments, a two-core FBG probe can be fabricated, and the diameter of the part without the coating of the fiber inscribed with FBG is d of the step 1; N=2, the inner diameter D of the tube can be a more accurate value of 2d+(1~5) μm, and the most compact self-assembly structure of the multi-core FBG is two paralleling fibers inscribed with FBG, whose diameters have been reduced, close to each other.

In some embodiments, a three-core FBG probe can be fabricated, and the diameter of the part without the coating of the fiber inscribed with FBG is d of the step 1; N=3, the inner diameter D of the tube can be a more accurate value of $$\left(\frac{2\sqrt{3}}{3}+1\right)d+(1\sim5)\ \mu m,$$

and the most compact self-assembly structure of the multi-core FBG is the arrangement where three fibers inscribed with FBG, whose diameters have been reduced, form a equilateral triangle and close to each other.

In some embodiments, a four-core FBG probe can be fabricated, and the diameter of the part without the coating of the fiber inscribed with FBG is d of the step 1; N=4, the inner diameter D of the tube can be a more accurate value of ($\sqrt{2}$+1)d+(1~5) μm, and the most compact self-assembly structure of the multi-core FBG is the arrangement where four fibers inscribed with FBG, whose diameters have been reduced, form a square and close to each other.

In some embodiments, a seven-core FBG probe can be fabricated, and the diameter of the part without the coating of the fiber inscribed with FBG is d of the step 1; N=7, the inner diameter D of the tube can be a more accurate value of 3d+(1~5) μm, and the most compact self-assembly structure of the multi-core FBG is the arrangement where seven fibers inscribed with FBG, whose diameters have been reduced, form a hexagon-honeycomb with two fibers for every side and close to each other.

The diameter ratio of the spherical tip to the polishing terminal of the polished multi-core FBG can be larger than 1.2.

The present invention has at least following advantages over prior art technologies:

(1). Flexible design of the parameters of the multi-core FBG probe. The parameter of the multi-core FBG probe can be designed as the requirement of the measurement, such as the diameter and length of the stylus and the diameter of the spherical tip.

(2) Good spectrum characters and high reflectivity of the FBGs. This invention avoids the directly inscription crosstalk of the FBG on the fiber cores of multi-core fiber and fibers inscribed with FBG are used to make the multi-core FBG probe.

(3) Low insertion loss and fabrication cost. The usage of the fibers inscribed with FBG to make the multi-core FBG probe avoids using the fan-out device. The insertion loss and fabrication cost is reduced.

DESCRIPTION OF THE DRAWINGS

FIG. 8 is a schematic illustration of the device for the installation method of a micro ball to fabricate a spherical tip on the polishing terminal of the polished multi-core FBG;

FIG. 9 is a partial view of the part B illustrated in FIG. 8;

FIG. 10A is a section A-A view of the two-core FBG when fabricating the two-core FBG probe;

FIG. 10B is a section A-A view of the three-core FBG when fabricating the three-core FBG probe;

FIG. 10C is a section A-A view of the four-core FBG when fabricating the four-core FBG probe;

FIG. 10D is a section A-A view of the seven-core FBG when fabricating the seven-core FBG probe.

DETAILED DESCRIPTION OF THE PREFERRED EMBODIMENTS

Figure 1:
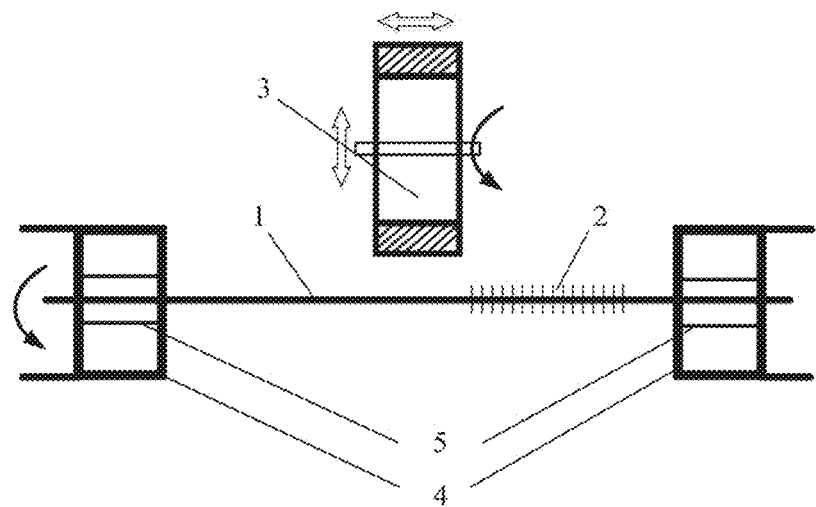
FIG. 1 is a schematic illustration of the device for the mechanical method to reduce the diameter of the fiber inscribed with FBG.
Figures 2, 3:
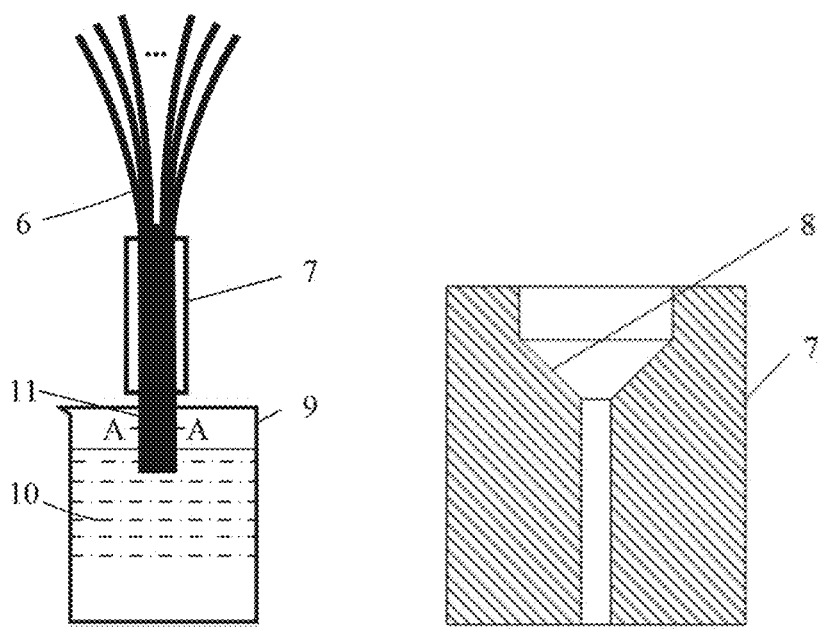
FIG. 2 is a schematic illustration of the device for the self-assembly of the fiber inscribed with FBG whose diameter has been reduced.
FIG. 3 is an illustration of the structure of the tube illustrated in FIG. 2.
Figure 4:
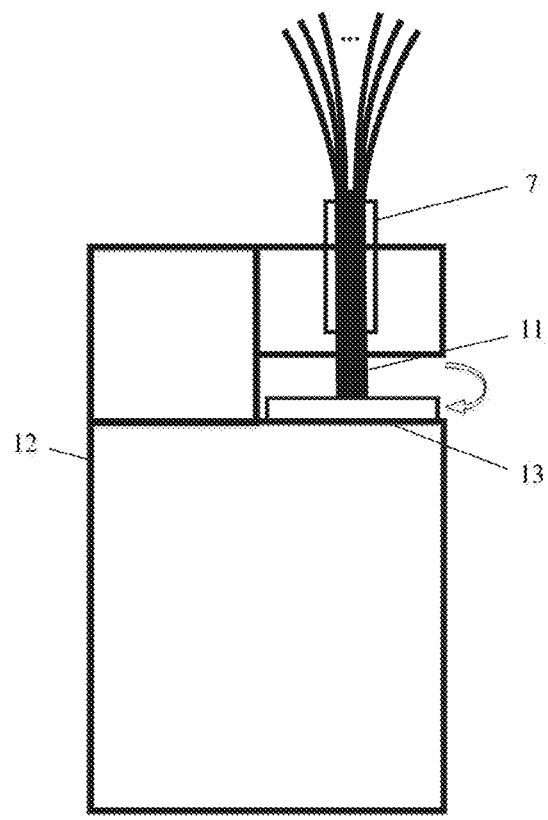
FIG. 4 is a schematic illustration of the device for polishing the terminal of the multi-core FBG.
Figure 5:
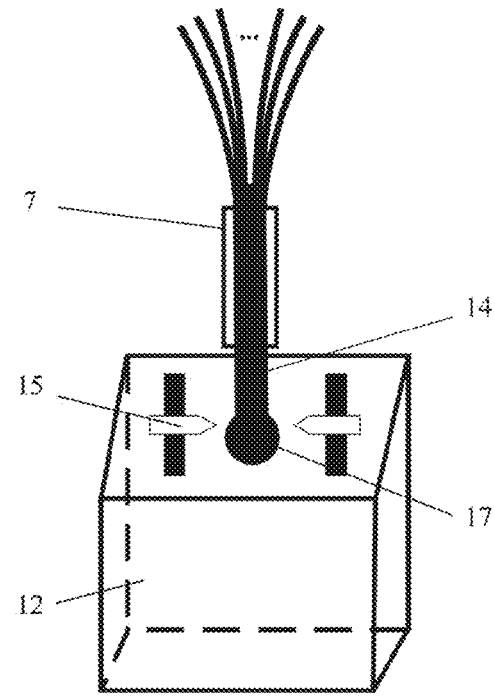
FIG. 5 is a schematic illustration of the device for the melting fiber method to fabricate a spherical tip on the polishing terminal of the polished multi-core FBG.

A fabrication method based on the capillary self-assemble technique of the multi-core FBG probe for measuring structures of a micro part includes following steps:

Step 1. Reducing the diameter of the fiber inscribed with FBG, which is shown in FIG. 1:

First, preparing a fiber 1 inscribed with FBG of 100 mm~1000 mm in length, where the FBG part 2, located at the 30 mm~50 mm from the terminal of the fiber 1 inscribed with FBG, is 10 mm~20 mm in length;

Second, stripping the coating of 50 mm~80 mm in length off the fiber 1 inscribed with FBG from its terminal close to the FBG part 2;

Third, reducing the diameter of the part without the coating of the fiber 1 inscribed with FBG using the mechanical method, this includes following procedures:

Straightening the fiber 1 inscribed with FBG,

Fixing the fiber 1 inscribed with FBG on the setting mechanism 5 of the synchronous-rotation motor 4 and aligning the axis of the fiber 1 inscribed with FBG with that of the synchronous-rotation motor 4, Polishing the fiber 1 inscribed with FBG, the wheel 3 covered by the polishing slice above the axis of rotation of the synchronous-rotation motor 4 polishes the part without the coating of the fiber 1 inscribed with FBG repeatedly at a constant speed along its axis, Monitoring the procedure of the polishing with a microscopy system and stopping the polishing when the diameter of the part without the coating of the fiber 1 inscribed with FBG is d, wherein d is in a range from 50 μm to 100 μm, and the fiber 6 inscribed with FBG whose diameter has been reduced is achieved;

Fourth, cutting off the fiber 6 inscribed with FBG whose diameter has been reduced of 30 mm~50 mm in length using a cleaver, and making sure that the FBG part 2 is located at the terminal of the fiber 6 inscribed with FBG whose diameter has been reduced and its length is in a range from 5 to 10 mm;

Then, washing the fiber 6 inscribed with FBG whose diameter has been reduced using an ultrasonic cleaner with the anhydrous ethanol for 5 min~20 min;

Step 2. Self-assembly of the fiber inscribed with FBG whose diameter has been reduced, which is shown in FIG. 2:

First, preparing a tube 7 of 10 mm~30 mm in length and D=(50 μm~00 μm)×3+(1 μm~50 μm) in inner diameter which has an inner taper angle 8 at one terminal as shown in FIG. 3;

Second, inserting the N fibers 6 inscribed with FBG whose diameter has been reduced by step 1 into the tube 7 from the terminal with an inner taper angle 8 and making sure that their FBG terminals of 5 mm~10 mm in length out of the tube 7 is parallel;

Third, fixing the tube 7 vertically and immersing the FBG terminal of the fibers 6 inscribed with FBG whose diameter has been reduced into the a glass 9 with the UV adhesive 10 of less than 100 cp in viscosity for 5 min~15 min, wherein the immersion depth is 3 mm~6 mm; the UV adhesive 10 is raised in the gaps between the fibers 6 inscribed with FBG whose diameter has been reduced and a most compact structure of fiber bundle is formed as a result of the capillary self-assembly;

Fourth, taking the tube 7 and the fiber bundle within the tube 7 out of the UV adhesive 10 without the dislocation of the fiber bundle, and curing the fiber bundle with UV adhesive 10 using a UV light for 1 min~10 min to form the multi-core FBG 11;

Then, filling the inner taper angle 8 of the tube 7 with the thermosetting adhesive and curing it using a heater at a constant temperature of 50° C.~180° C. for 10 min~60 min;

Step 3. Polishing the terminal of the multi-core FBG, which is shown in FIG. 4:

First, fixing the tube 7 with the multi-core FBG 11 on the optic fiber polishing machine 12 and adjusting the height of the tube 7 to make the terminal of the multi-core FBG 11 contacted with the polishing slices 3;

Second, polishing the terminal of the multi-core FBG 11 as the way for processing the FC/PC connector and stopping the polishing when the terminal is smooth and impeccable, and the polished multi-core FBG 14 is achieved;

Then, cleaning the terminal of the polished multi-core FBG 14 using the dust-free paper and anhydrous ethanol;

Step 4. Fabricating a spherical tip on the polishing terminal of the polished multi-core FBG through the melting fiber method shown in FIG. 5:

First, fixing the tube 7 with the polished multi-core FBG 14 processed by step 3 vertically;

Second, adjusting the height of the polished multi-core FBG 14 and make the polishing terminal located at 0.5 mm~3 mm below the electrode 15 of the electric discharge machine 16;

Third, adjusting the discharge time and intensity of the electric discharge machine 16 and melting the polished multi-core FBG 14; the melt fiber forms a favorable sphere because of the gravity and the surface tension, and a spherical tip 17 is fabricated on the polishing terminal of the polished multi-core FBG 14 after it becomes cool; a multi-core FBG probe is thus fabricated.

Figure 6:
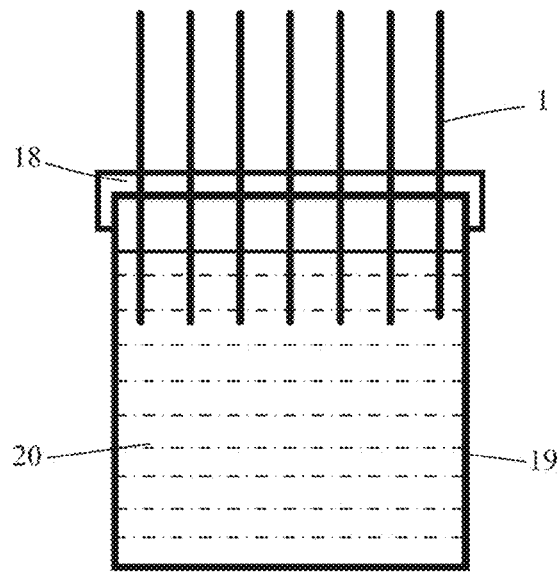
FIG. 6 is a schematic illustration of the device for the etch method by the hydrofluoric acid to reduce the diameter of the fiber inscribed with FBG.
Figure 7:
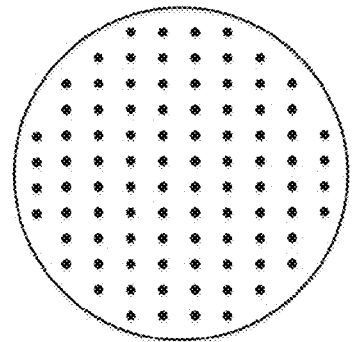
FIG. 7 is a top view of the cover of the plastic bucket illustrated in FIG. 6.

The third procedure of the step 1 can be achieved using a etch method by the hydrofluoric acid to reduce the diameter of the fiber inscribed with FBG shown in FIG. 6:

Inserting the fiber 1 inscribed with FBG through the micro holes on the cover 18 (FIG. 7 shows its top view) of the plastic bucket 19 with the hydrofluoric acid solution 20 of 10%~50% in volume fraction and making the part without the coating of the fiber 1 inscribed with FBG downward into the plastic bucket 19;

Adjusting the length of the fiber 1 inscribed with FBG out of the cover 18 and making the part without the coating of the fiber 1 inscribed with FBG immersing into the hydrofluoric acid solution 20 of 10%~50% in volume fraction, wherein the immersion depth is 3 mm~6 mm;

Taking the fiber 1 inscribed with FBG out of the plastic bucket 19 every 20 min~30 min and measuring the diameter of the part without the coating of the fiber 1 inscribed with FBG using a microscope;

Stopping the etch process when the diameter of the part without the coating of the fiber 1 inscribed with FBG is etched to d, wherein d is in a range from 50 μm to 100 μm, and the fiber 6 inscribed with FBG whose diameter has been reduced is achieved;

Putting the fiber 6 inscribed with FBG whose diameter has been reduced into the glass with the acetone solution for 10 min~30 min for the softening process, wherein the immersion depth is 80 mm~90 mm.

The step 2 can be dropping the UV adhesive on these fibers inscribed with FBG whose diameter has been reduced:

First, preparing a tube 7 of 10 mm~30 mm in length and D in diameter which has an inner taper angle 8 at one terminal;

Second, inserting the N fibers 6 inscribed with FBG whose diameter has been reduced by step 1 into the tube 7 from the terminal with an inner taper angle 8 and making sure that their FBG terminals of 5 mm~10 mm in length out of the tube 7 is parallel;

Third, fixing the tube 7 horizontally and dropping the UV adhesive of less than 100 cp in viscosity on these fibers between the tube 7 and the terminal of the fibers 6 inscribed with FBG whose diameter has been reduced;

Fourth, holding the tube 7 for 5 min~15 min, and the UV adhesive wets the fibers 6 and forms the capillary bridges between the close fibers 6 inscribed with FBG whose diameter has been reduced which are thus subjected to the capillary force, and a most compact structure of fiber bundle is formed as a result of the capillary self-assembly;

Fifth, curing the fiber bundle with UV adhesive using a UV light for 1 min~10 min to form the multi-core FBG 11;

Then, filling the inner taper angle 8 of the tube 7 with the thermosetting adhesive and curing it using a heater at a constant temperature of 50° C.~180° C. for 10 min~60 min.

The material of the tube 7 of the step 2 is quartz or metal.

Fabricating a spherical tip on the polishing terminal of the polished multi-core FBG of step 4 can be achieved through installation method of a micro ball, which is shown in FIG. 8:

First, fixing the tube 7 with the polished multi-core FBG 14 processed by step 3 parallelly on an adjustment device 24 with six degree of freedom;

Second, dropping the UV adhesive onto the polishing terminal of the polished multi-core FBG 14 using a micropipette;

Third, aligning the axes of the polishing terminal of the polished multi-core FBG 14 with UV adhesive and the spherical ruby tip 21 on the V-groove 23 of the horizontal bench 22 (shown in FIG. 9) under a microscope, and pushing ahead the polishing terminal of the polished multi-core FBG 14 to get contacted with the spherical ruby tip 21;

Fourth, curing the contact point with UV adhesive using a UV light for 1 min~10 min, and a spherical tip 21 is fabricated on the polishing terminal of the polished multi-core FBG 14; a multi-core FBG probe is thus fabricated.

A two-core FBG probe can be fabricated, and the diameter of the part without the coating of the fiber 1 inscribed with FBG is d of the step 1; N=2, the inner diameter D of the tube 7 can be a more accurate value of 2d+(1~5) μm, and the most compact self-assembly structure of the multi-core FBG 11 is two paralleling fibers 6 inscribed with FBG, whose diameters have been reduced, close to each other as section A-A view shown in FIG. 10A.

A three-core FBG probe can be fabricated, and the diameter of the part without the coating of the fiber 1 inscribed with FBG is d of the step 1; N=3, the inner diameter D of the tube 7 can be a more accurate value of $$\left(\frac{2\sqrt{3}}{3}+1\right)d + (1 \sim 5) \text{ μm},$$

and the most compact self-assembly structure of the multi-core FBG 11 is the arrangement where three fibers inscribed with FBG 6, whose diameters have been reduced, form a equilateral triangle and close to each other as section A-A view shown in FIG. 10B. A four-core FBG probe can be fabricated, and the diameter of the part without the coating of the fiber 1 inscribed with FBG is d of the step 1; N=4, the inner diameter D of the tube 7 can be a more accurate value of ($\sqrt{2}$+1)d+(1~5) μm, and the most compact self-assembly structure of the multi-core FBG 11 is the arrangement where four fibers 6 inscribed with FBG, whose diameters have been reduced, form a square and close to each other as section A-A view shown in FIG. 10C.

A seven-core FBG probe can be fabricated, and the diameter of the part without the coating of the fiber 1 inscribed with FBG is d of the step 1; N=7, the inner diameter D of the tube 7 can be a more accurate value of 3d+(1~5) μm, and the most compact self-assembly structure of the multi-core FBG 11 is the arrangement where seven fibers inscribed with FBG 6, whose diameters have been reduced, form a hexagon-honeycomb with two fibers for every side and close to each other as section A-A view shown in FIG. 10D.

The diameter ratio of the spherical tip 17 or 21 to the polishing terminal of the polished multi-core FBG 14 is larger than 1.2.

What is claimed is:

1. A fabrication method of a multi-core FBG probe for measuring structures of a micro part based on the capillary self-assemble technique, comprising:
    reducing the diameter of the fiber inscribed with FBG by:
        preparing a fiber, inscribed with FBG, of 100 mm~1000 mm in length; where the FBG part, located at the 30 mm~50 mm from the terminal of the fiber inscribed with FBG, is 10 mm~20 mm in length;
    stripping a coating of 50 mm~80 mm in length off the fiber inscribed with FBG from its terminal close to the FBG part;
    reducing the diameter of the FBG part without the coating of the fiber inscribed with FBG using a mechanical method, which includes:
        straightening the fiber inscribed with FBG,
        fixing the fiber inscribed with FBG on a setting mechanism of a synchronous-rotation motor and aligning the axis of the fiber inscribed with FBG with that of the synchronous-rotation motor,
        polishing the fiber inscribed with FBG, the wheel covered by the polishing slice above the axis of rotation of the synchronous-rotation motor polishes the part without the coating of the fiber inscribed with FBG repeatedly at a constant speed along its axis, and
        monitoring the procedure of the polishing with a microscopy system and stopping the polishing when the diameter of the part without the coating of the fiber inscribed with FBG is d, wherein d is in a range from 50 μm to 100 μm, and the fiber inscribed with FBG whose diameter has been reduced is achieved;
    cutting off the fiber inscribed with FBG whose diameter has been reduced of 30 mm~50 mm in length using a cleaver, and making sure that the FBG part is located at the terminal of the fiber inscribed with FBG whose diameter has been reduced and its length is in a range from 5 to 10 mm; and
    washing the fiber inscribed with FBG whose diameter has been reduced using an ultrasonic cleaner with the anhydrous ethanol for 5 min~20 min;
Self-assembling the fiber inscribed with FBG whose diameter has been reduced by:
    preparing a tube of 10 mm~30 mm in length and D=(50 μm~100 μm)×3+(1 μm~50 μm) in inner diameter which has an inner taper angle at one terminal;
    inserting the N fibers inscribed with FBG whose diameter has been reduced by step 1 into the tube from the terminal with an inner taper angle and making sure that their FBG terminals of 5 mm~10 mm in length out of the tube is parallel;
    fixing the tube vertically and immersing the FBG terminal of the fibers inscribed with FBG whose diameter has been reduced into the a glass with the UV adhesive of less than 100 cp in viscosity for 5 min~15 min, wherein the immersion depth is 3 mm~6 mm; the UV adhesive is raised in the gaps between the fibers inscribed with FBG whose diameter has been reduced and a most compact structure of fiber bundle is formed as a result of the capillary self-assembly;
    taking the tube and the fiber bundle within the tube out of the UV adhesive without the dislocation of the fiber bundle, and curing the fiber bundle with UV adhesive using a UV light for 1 min~10 min to form the multi-core FBG; and filling the inner taper angle of the tube with the thermosetting adhesive and curing it using a heater at a constant temperature of 50° C.~180° C. for 10 min~60 min; polishing the terminal of the multi-core FBG by:

fixing the tube with the multi-core FBG on an optic fiber polishing machine and adjusting the height of the tube to make the terminal of the multi-core FBG contacted with the polishing slice;

polishing the terminal of the multi-core FBG as the way for processing a FC/PC connector and stopping the polishing when the terminal is smooth and impeccable, and the polished multi-core FBG is achieved; and cleaning the terminal of the polished multi-core FBG using the dust-free paper and anhydrous ethanol;

fabricating a spherical tip on the polishing terminal of the polished multi-core FBG by:

fixing the tube with the polished multi-core FBG processed by step 3 vertically;

adjusting the height of the polished multi-core FBG and make the polishing terminal located at 0.5 mm~3 mm below the electrode of the electric discharge machine; and adjusting discharge time and intensity of an electric discharge machine and melting the polished multi-core FBG; the melt fiber forms a favorable sphere because of the gravity and the surface tension, and a spherical tip is fabricated on the polishing terminal of the polished multi-core FBG after it becomes cool; a multi-core FBG probe is thus fabricated.

2. The fabrication method of claim 1, wherein reducing the diameter of the part is achieved using a etch method by the hydrofluoric acid to reduce the diameter of the fiber inscribed with FBG, which comprises:

inserting the fiber inscribed with FBG through the micro holes on the cover of the plastic bucket with the hydrofluoric acid solution of 10%~50% in volume fraction and making the part without the coating of the fiber inscribed with FBG downward into the plastic bucket;

adjusting the length of the fiber inscribed with FBG out of the cover and making the part without the coating of the fiber inscribed with FBG immersing into the hydrofluoric acid solution of 10%~50% in volume fraction, wherein the immersion depth is 60 mm~90 mm;

taking the fiber inscribed with FBG out of the plastic bucket every 20 min~30 min and measuring the diameter of the part without the coating of the fiber inscribed with FBG using a microscope;

stopping the etch process when the diameter of the part without the coating of the fiber inscribed with FBG is etched to d, wherein d is in a range from 50 µm to 100 µm, and the fiber inscribed with FBG whose diameter has been reduced is achieved; and putting the fiber inscribed with FBG whose diameter has been reduced into the glass with the acetone solution for 10 min~30 min for the softening process, wherein the immersion depth is 80 mm~90 mm.

3. The fabrication method of claim 1, wherein Self-assembling the fiber inscribed with FBG whose diameter has been reduced is achieved by dropping the UV adhesive on these fibers inscribed with FBG whose diameter has been reduced, which comprises:

preparing a tube of 10 mm~30 mm in length and D in diameter which has an inner taper angle at one terminal;

inserting the N fibers inscribed with FBG whose diameter has been reduced by step 1 into the tube from the terminal with an inner taper angle and making sure that their FBG terminals of 5 mm~10 mm in length out of the tube is parallel;

fixing the tube horizontally and dropping the UV adhesive of less than 100 cp in viscosity on said these fibers between the tube and the terminal of the fibers inscribed with FBG whose diameter has been reduced;

holding the tube for 5 min~15 min, and the UV adhesive wets the fibers and forms the capillary bridges between the close fibers inscribed with FBG whose diameter has been reduced which are thus subjected to the capillary force, and a most compact structure of fiber bundle is formed as a result of the capillary self-assembly;

curing the fiber bundle with UV adhesive using a UV light for 1 min~10 min to form the multi-core FBG; and filling the inner taper angle of the tube with the thermosetting adhesive and curing it using a heater at a constant temperature of 50° C.~180° C. for 10 min~60 min.

4. The fabrication method of claim 1 wherein the material of the tube is quartz or metal.

5. The fabrication method of claim 1, wherein fabricating a spherical tip on the polishing terminal of the polished multi-core FBG is achieved through installation method of a micro ball:

fixing the tube with the polished multi-core FBG processed by step 3 parallelly on an adjustment device with six degree of freedom;

dropping the UV adhesive onto the polishing terminal of the polished multi-core FBG using a micropipette;

aligning the axes of the polishing terminal of the polished multi-core FBG with UV adhesive with the spherical ruby tip on the V-groove of the horizontal bench under a microscope, and pushing ahead the polishing terminal of the polished multi-core FBG to get contacted with the spherical ruby tip; and curing the contact point with UV adhesive using a UV light for 1 min~10 min, and a spherical tip is fabricated on the polishing terminal of the polished multi-core FBG; a multi-core FBG probe is thus fabricated.

6. The fabrication method of claim 1, wherein a two-core FBG probe is fabricated, and wherein said diameter of the part without the coating of the fiber inscribed with FBG is d of the step 1; N=2, the inner diameter D of the tube can be a more accurate value of 2d+(1~5) µm, and the most compact self-assembly structure of the multi-core FBG is two paralleling fibers inscribed with FBG, whose diameters have been reduced, close to each other.

7. The fabrication method of claim 1, wherein a three-core FBG probe is fabricated, and wherein said diameter of the part without the coating of the fiber inscribed with FBG is d of the step 1; N=3, the inner diameter D of the tube can be a more accurate value of $$\left(\frac{2\sqrt{3}}{3}+1\right)d + (1 \sim 5) \text{ µm},$$

and the most compact self-assembly structure of the multi-core FBG is the arrangement where three fibers inscribed with FBG, whose diameters have been reduced, form a equilateral triangle and close to each other.

8. The fabrication method of claim 1, wherein a four-core FBG probe is fabricated, and wherein said diameter of the part without the coating of the fiber inscribed with FBG is d of the step 1; N=4, the inner diameter D of the tube can be a more accurate value of $(\sqrt{2}+1)d+(1\sim5)$ μm, and the most compact self-assembly structure of the multi-core FBG is the arrangement where four fibers inscribed with FBG, whose diameters have been reduced, form a square and close to each other.

9. The fabrication method of claim 1, wherein a seven-core FBG probe is fabricated, and wherein said diameter of the part without the coating of the fiber inscribed with FBG is d of the step 1; N=7, the inner diameter D of the tube can be a more accurate value of $3d+(1\sim5)$ μm, and the most compact self-assembly structure of the multi-core FBG is the arrangement where seven fibers inscribed with FBG, whose diameters have been reduced, form a hexagon-honeycomb with two fibers for every side and close to each other.

10. The fabrication method of claim 1, wherein the diameter ratio of the spherical tip to the polishing terminal of the polished multi-core FBG is larger than 1.2.

* * * * *